United States Patent
Komatsu et al.

[19]

[11] Patent Number: 6,133,979
[45] Date of Patent: Oct. 17, 2000

[54] LIQUID CRYSTAL DISPLAY DEVICE WITH INTERNAL HEATING ELEMENT

[75] Inventors: Hiroshi Komatsu; Jong Wook Park, both of Kyungsangbuk-do, Rep. of Korea

[73] Assignee: LG Electronics Inc., Seoul, Rep. of Korea

[21] Appl. No.: 08/936,019

[22] Filed: Sep. 23, 1997

[30] Foreign Application Priority Data

Sep. 23, 1996 [KR] Rep. of Korea ................. 96-41778

[51] Int. Cl.[7] ................... G02F 1/1333; G02F 1/133; G02F 1/1335
[52] U.S. Cl. ................ 349/161; 349/72; 349/22; 349/61
[58] Field of Search ................ 349/72, 161, 22, 349/61, 62, 65

[56] References Cited

U.S. PATENT DOCUMENTS

| | | | |
|---|---|---|---|
| 3,581,002 | 5/1971 | Dodds | 178/7.84 |
| 3,999,838 | 12/1976 | Sprokel | 350/160 LC |
| 4,031,529 | 6/1977 | Borel et al. | 340/324 R |
| 4,093,355 | 6/1978 | Kaplit et al. | 349/161 |
| 4,119,842 | 10/1978 | Hayden et al. | 349/161 |
| 4,386,836 | 6/1983 | Aoki et al. | 355/3 R |
| 4,634,225 | 1/1987 | Haim et al. | 349/161 |
| 4,743,972 | 5/1988 | Makihara | 358/213.11 |
| 4,754,373 | 6/1988 | Otto et al. | 362/61 |
| 4,775,221 | 10/1988 | Baumgartner, Jr. | 349/72 |
| 5,088,806 | 2/1992 | McCartney et al. | 349/72 |
| 5,150,231 | 9/1992 | Iwamoto et al. | 349/72 |
| 5,247,374 | 9/1993 | Terada | 349/161 |
| 5,299,038 | 3/1994 | Hamada et al. | 349/161 |
| 5,479,065 | 12/1995 | Sugimoto et al. | 313/113 |
| 5,548,403 | 8/1996 | Sommargren | 356/354 |
| 5,606,440 | 2/1997 | Kawaguchi et al. | 349/188 |
| 5,689,109 | 11/1997 | Schütze | 250/251 |
| 5,742,366 | 4/1998 | Imoto | 349/161 |
| 5,744,819 | 4/1998 | Yamamoto et al. | 349/72 |
| 5,767,934 | 6/1998 | Goddard | 349/72 |

FOREIGN PATENT DOCUMENTS

| | | |
|---|---|---|
| 62-71395 | 4/1987 | Japan . |
| 62-153835 | 7/1987 | Japan . |
| 2-287320 | 11/1990 | Japan . |
| 2-311819 | 12/1990 | Japan . |
| 5-2164 | 1/1993 | Japan . |
| 7-36058 | 2/1995 | Japan . |
| 7-225388 | 8/1995 | Japan . |
| 409203687 | 8/1997 | Japan . |
| 409203687A | 8/1997 | Japan . |

OTHER PUBLICATIONS

Keifer, R. et al., "In–plane Switching of Nematic Liquid Crystals", Japan Display, 1992, pp. 547–550.

Ohta, M. et al., "Development of Super–TFT–LCDs With In–plane Switching Display Mode", Asia Display, 1995, pp. 707–710.

*Primary Examiner*—William L. Sikes
*Assistant Examiner*—Tarifur R. Chowdhury
*Attorney, Agent, or Firm*—Morgan, Lewis & Bockius LLP

[57] ABSTRACT

A liquid crystal display device Includes a liquid crystal panel having a first substrate, a second substrate, and a liquid crystal layer between the first and the second substrates. A first polarizer is on the first substrate and a second polarizer on the second substrate. A backlight produces light and a light guide plate adjacent the backlight guides the light from the backlight to the liquid crystal panel. A light diffusion plate is between the liquid crystal panel and the light guide plate. A temperature controlling member controls the temperature of the liquid crystal panel to be within a set range and the temperature controlling member is connected to the liquid crystal panel and the heating plate.

29 Claims, 5 Drawing Sheets

LIQUID CRYSTAL DISPLAY DEVICE WITH INTERNAL HEATING ELEMENT

BACKGROUND OF THE INVENTION

1. Field of the Invention

The present invention relates to a liquid crystal display device, and more particularly, to a liquid crystal display device having good image quality.

2. Discussion of the Related Art

Recently, a thin film transistor liquid crystal display device(TFT LCD) has been used as a display device for portable televisions and notebook computers. However, such a TFT LCD has an angular dependence problem.

In order to solve the angular dependence problem, a twisted nematic LCD having an optical compensation plate and a multi-domain LCD has been introduced. In this type of LCD, however, since contrast ratio is dependent upon the viewing angle direction, the color of the image changes.

For a wide viewing angle, an in-plane switching LCD has been proposed in such papers as JAPAN DISPLAY 92 p547, Japanese Patent Unexamined Publication No. 7-36058, Japanese Patent Unexamined Publication No. 7-225538, and ASIA DISPLAY 95 P707.

FIG. 1 is a plan view of a TFT array substrate of the conventional in-plane switching LCD. As shown in FIG. 1, data electrodes 5 and common electrodes 6, which apply electric field to the liquid crystal layer, are arranged in the pixel region defined by a gate bus line 1 and a data bus line 2 crossing each other. At the crossing region of the gate bus line 1 and the data bus line 2, the thin film transistor of which a gate electrode 3 and source/drain electrodes 4 are respectively connected to the gate bus line 1 and the data bus line 2 is positioned. When the voltage is applied to the data electrodes 5 and the common electrodes 6, the electric field is generated in plane of the surface of the substrate. Thus, in the in-plane switching LCD, the liquid crystal molecules are rotated in plane of the surface of the substrate. Thus, the angular dependence problem caused by the refractive anisotropy of the liquid crystal molecule is prevented.

FIG. 2 is a view showing the conventional LCD and FIG. 3 is a sectional view taken along line A—A' of FIG. 2. As shown in the Figures, a metal frame 15 protects the liquid crystal panel 20 except a representation unit 18. In the frame 15, an outer driving circuit including a gate driving circuit 11a and a data driving circuit 11b and a back light reflecting plate 13 including a back light 14 are mounted. In the representation unit 18, a light guide plate 29 having a light diffusion plate 21, a polarizer 23, a first substrate 25, a second substrate 26, and an analyzer 24 are sequentially mounted. A liquid crystal layer 2B is formed between the first and second substrates. At that time, the optical compensation plate can be mounted between the polarizer 23 and the first substrate 25 or the second substrate 26 and the analyzer 24.

In general, the elastic coefficient caused by the rotation in the plane level of the in-plane switching LCD is higher than the elastic coefficient caused by the rotation in the vertical direction of the TN LCD, 60 that the response speed of the in-plane switching LCD is lower than that of the TN LCD. In addition, the panel temperature of the conventional in-plane switching LCD is about 30° for the room temperature. At this temperature, the response speed of the liquid crystal having a viscosity of about 20 cp is less than about 70 msec. since a large size LCD more than 20 inches has a slow response speed, i.e., the rotation speed of the liquid crystal molecules, therefore, the image is intermitted and undesirable for dynamic image.

SUMMARY OF THE INVENTION

Accordingly, the present invention is directed to a liquid crystal display device that substantially obviates one or more of the problems due to limitations and disadvantages of the related art.

It is an object of the present invention to provide a liquid crystal display device having good image quality from an increase in the response speed.

It is another object of the present invention to provide a liquid crystal display device including liquid crystal panel that prevents characteristic variations due to temperature variations.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, a liquid crystal display device comprises a liquid crystal panel including a first substrate, a second substrate, and a liquid crystal layer between the first and second substrate; and a heating member adjacent the liquid crystal layer for heating the liquid crystal panel.

In another aspect of the present invention, a liquid crystal display device comprises a liquid crystal panel including a first substrate, a second substrate, and a liquid crystal layer between the first and second substrates; a backlight adjacent the liquid crystal panel for irradiating light, the backlight including a material for heating the liquid crystal panel; and a temperature controlling member coupled to the liquid crystal panel and the backlight for controlling a temperature of the liquid crystal panel to be within a set range.

In another aspect of the present invention, a liquid crystal display device comprises a liquid crystal panel including a first substrate, a second substrate, and a liquid crystal layer between the first and second substrates; a transparent heater for heating the liquid crystal panel; and a temperature controlling member coupled to the liquid crystal panel and the transparent heater for controlling the temperature of the liquid crystal panel to be within a set range.

In another aspect of the present invention, a liquid crystal display device comprises a liquid crystal panel including a first substrate, a second substrate, and a liquid crystal layer between the first and second substrates; a heating plate for heating the liquid crystal panel; and a temperature controlling member for controlling the temperature of the liquid crystal panel to be within a set range, the temperature controlling member being connected to the liquid crystal panel and the heating plate.

In a further aspect of the present invention, a liquid crystal display device comprises a liquid crystal panel including a first substrate, a second substrate, and a liquid crystal layer between the first and the second substrates; a first polarizer on the first substrate; a second polarizer on the second substrate; a backlight for producing light; a light guide plate adjacent the backlight for guiding light from the backlight to the liquid crystal panel; a light diffusion plate between the liquid crystal panel and the light guide plate; and a temperature controlling member connected to the liquid crystal panel and the heating plate for controlling the temperature of the liquid crystal panel.

It is to be understood that both the foregoing general description and the following detailed description are exemplary and explanatory only are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention, In the drawings.

DETAILED DESCRIPTION OF THE PREFERRED EMBODIMENTS

Reference will now be made in detail to the preferred embodiments of the present invention, examples of which are illustrated in the accompanying drawings.

The liquid crystal display device of the present invention includes a liquid crystal panel, a heating member for heating the liquid crystal panel, and a temperature controlling member for controlling the temperature of the liquid crystal panel at a predetermined temperature.

Two types heating member may be used—a backlight and a heater. For the backlight, an infrared radiation material is added to the backlight to heat the liquid crystal panel by the irradiation of the infrared light. For the heater, a transparent heater may formed on the liquid crystal panel or an opaque heating plate may be mounted at the rear the light guide plate.

The temperature controlling member includes a temperature sensing unit attached to the liquid crystal panel and a temperature controlling unit to maintain the liquid crystal panel at a preferable temperature of 40–50° C. The viscosity of the liquid crystal is preferably about 1 cp and the response speed is preferably about 40 msec.

Figure 1:
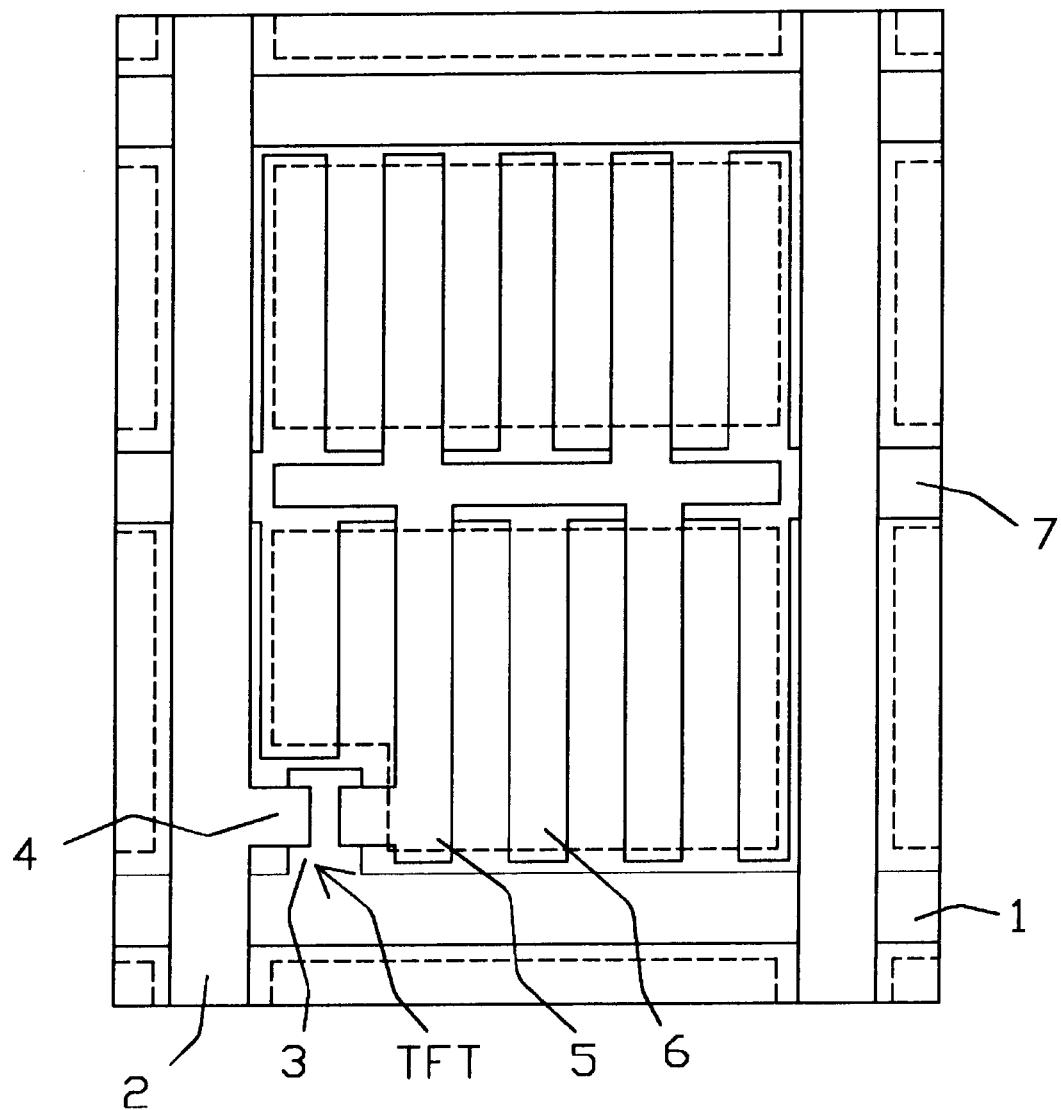
FIG. 1 is a plan view of the TFT array substrate according to the conventional in-plane switching liquid crystal display device.
Figure 2:
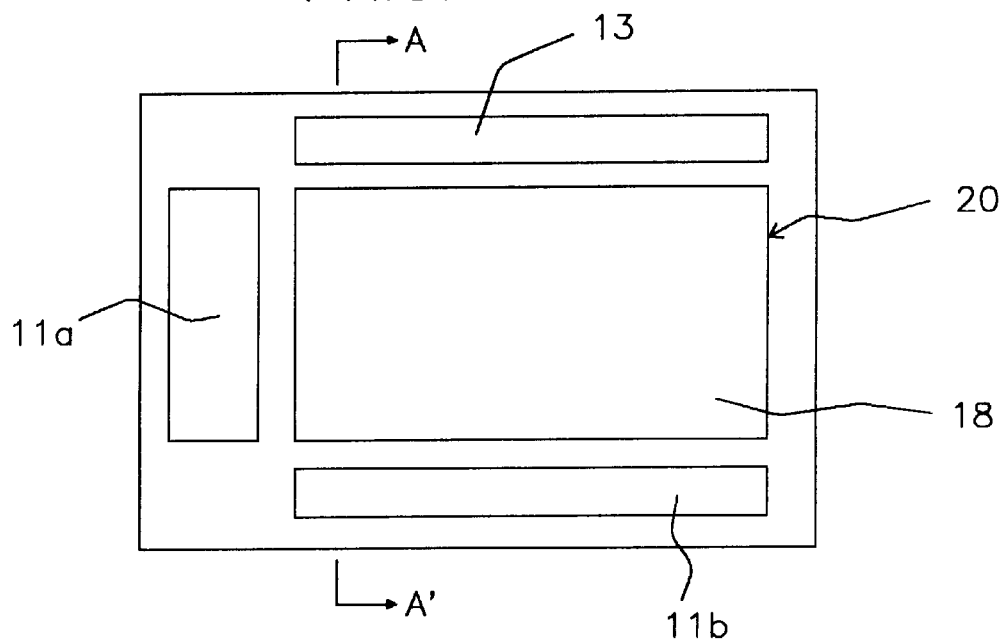
FIG. 2 is a view showing the conventional liquid crystal display device.
Figure 3:
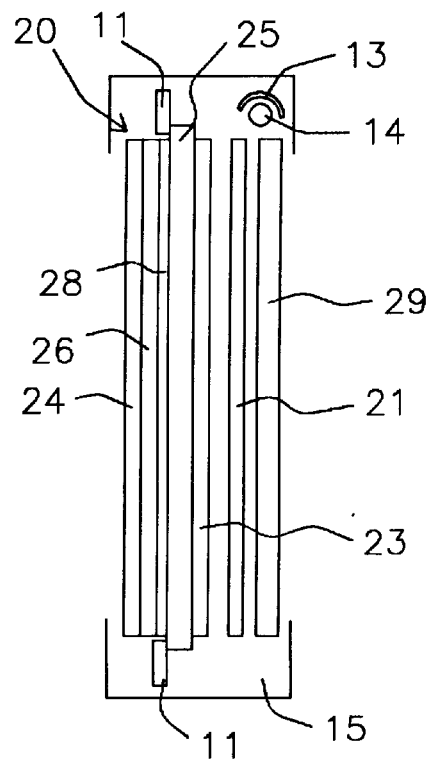
FIG. 3 is a sectional view taken along the line A—A' of FIG.2.
Figure 4:
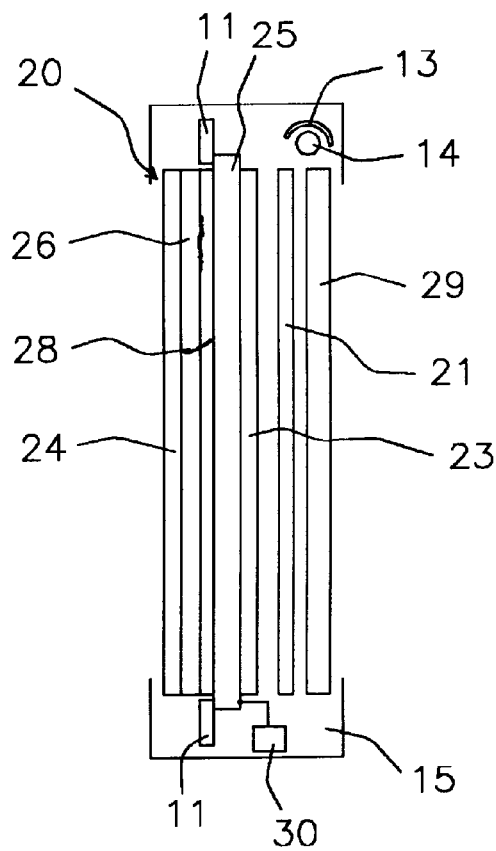
FIG. 4 is a sectional view according to the first embodiment of the present invention.

Referring to FIG. 4, the metal frame 15 protects the liquid crystal panel 20 except the representation unit 18. In the frame 15, the outer driving circuit including a gate driving circuit 11a and the data driving circuit 11b, and a back light reflecting plate 13 including a backlight 14 are mounted. In the representation unit 18, a light guide plate 29 having a light diffusion plate 21, a polarizer 23, a first substrate 25, a second substrate 26, and an analyzer 24 are sequentially mounted. The liquid crystal layer 28 is formed between the first and second substrates. At that time, an optical compensation plate is mounted between the polarizer 23 and the first substrate 25 or the second substrate 26 and the analyzer 24.

A spacer, not shown in figure, retains a regular interval between the first and second substrates 25,26, and the liquid crystal layer 28 is formed therebetween. Further, a temperature controlling device 30 is connected to the liquid crystal panel 20 and the backlight 14 to control the transparent of the liquid crystal panel 20 at the predetermined temperature (see FIG. 6). Since the infrared radiation materials is added in the backlight 14, the light from the backlight 14 heats the liquid crystal panel 20 while passing the liquid crystal panel.

Figure 5:
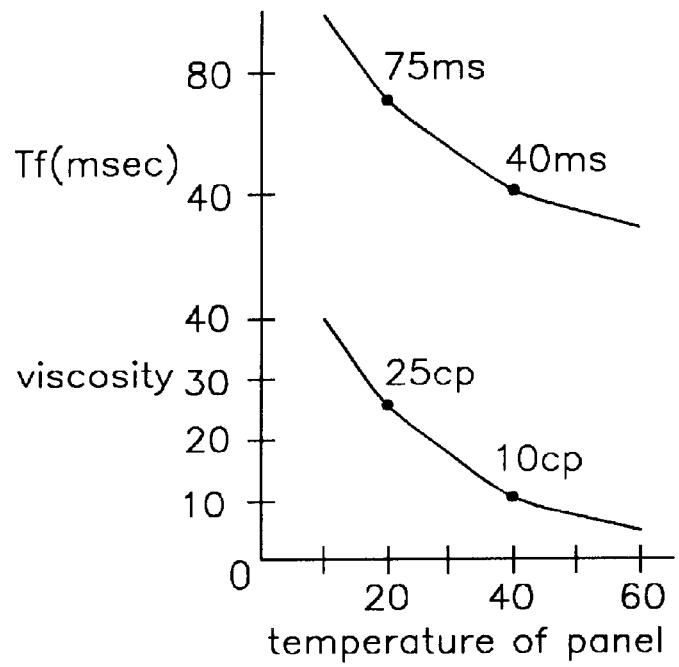
FIG. 5 is a graph showing the relation between the temperature of the liquid crystal panel, the viscosity of the liquid crystal, and the response speed of the liquid crystal.

In general, a high quality or confidence liquid crystal has a viscosity of 20–25 cp at a temperature of 20° C. The response speed, specially for falling time Tf, is about 75 msec. When the liquid crystal panel is heated to increase the temperature of the panel, the viscosity of the liquid crystal becomes gradually low and the corresponding response speed Tf becomes higher, as shown in FIG. 5. In practical LCDs having a large screen of more than 20 inches for dynamic image, the response speed must be less than 40 msec to produce a smooth image. Further, the viscosity of the liquid crystal must be less than 10 cp to operate the liquid crystal at such response speed. As shown in FIG. 5, the temperature of the liquid crystal panel must be more than about 40° C. for the response speed Tf to be less than 40msec and the viscosity to be less than 10 cp.

If the liquid crystal panel is over-heated, however, it has a short life. Thus, it is needed to control the temperature of the liquid crystal panel to be less than 50° C., As a result, the temperature of the liquid crystal panel must be controlled at a temperature of 40–50° C. for high response speed Tf and long life.

Figure 6:
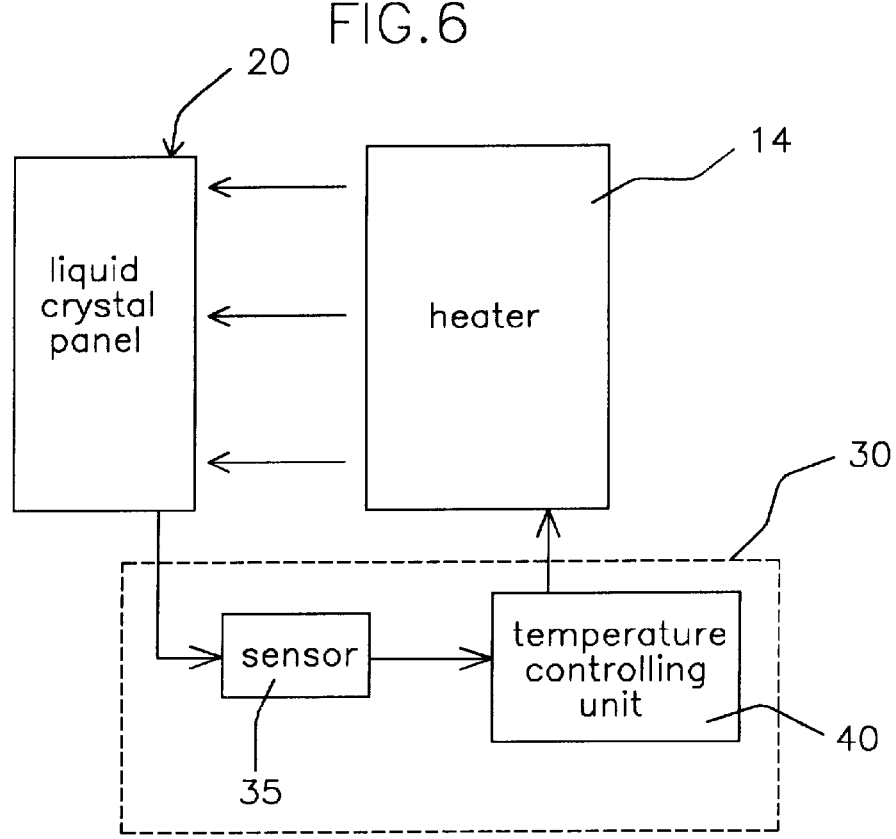
FIG. 6 is a block diagram of the temperature controlling device.

The temperature of the liquid crystal panel can be controlled by the temperature controlling device 30 shown in FIG. 6. The temperature controlling device 30 comprises a temperature sensing unit 35, i.e., sensor for sensing the temperature of the liquid crystal panel 20, and a temperature controlling unit 40 by which a predetermined temperature is set when the temperature sensing unit 35 senses the temperature of the liquid crystal panel 20 heated by the heater (the backlight including the infrared radiation materials in this embodiment), the temperature controlling unit 40 receives a signal from the temperature sensing unit 35 to sense or recognize the present temperature of the liquid crystal panel 20. If the temperature of the liquid crystal panel 20 is lower than the predetermined temperature set in the temperature controlling unit 40, the liquid crystal panel is exposed with light having high infrared irradiation intensity from the backlight 14 to increase the temperature of the liquid crystal panel 20. If the liquid crystal panel 20 is heated to more than the predetermined temperature, however, light having low intensity is irradiated into the liquid crystal panel to maintain its temperature at 40–50° C.

In the LCD according to the first embodiment of the present invention, as described above, the liquid crystal panel is heated to a temperature In the range of 40–50° C. by the backlight including the Infrared radiation materials and the temperature controlling device 30. Thus, the response speed of the liquid crystal is increased and the intermittence of the dynamic image is prevented.

Figure 7:
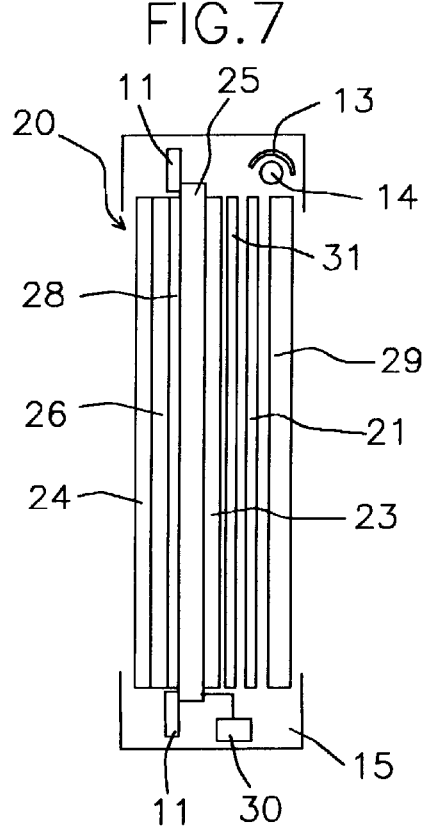
FIG. 7 is a sectional view of the second embodiment of the present invention.

FIG. 7 is a view showing the second embodiment of the present invention. In this embodiment the heating member is a transparent heater.

As shown in FIG. 7, a transparent heater 31 is mounted between the liquid crystal panel 20 and the light diffusing plate 21. The transparent heater 31 is fabricated by depositing transparent electrodes having certain resistance, such as indium tin oxide, on the plastic film of the liquid crystal panel 20. When a voltage is applied to the transparent electrode, the resistance of the transparent electrode generates heat and the liquid crystal panel 20 is heated by this heat. The temperature controlling device 30 connected to the liquid crystal panel 20 senses its temperature with the temperature sensing unit 35 and retains its temperature at 40–50° C., which is preset in the temperature controlling unit. The temperature controlling unit 40 of the temperature controlling device 30 is connected to the power supply(not shown in Figure) for supplying the voltage to the transparent electrode.

If the temperature of the liquid crystal panel 20 is lower than the preset temperature in the temperature controlling unit 40, the temperature controlling unit 40 sends a signal to the power supply to increase the voltage applied to the liquid crystal panel 20. If the temperature of the liquid crystal panel is higher than the preset temperature, the temperature controlling unit 40 sends a signal to the power supply to decrease the voltage applied to the liquid crystal panel 20 for maintaining a constant temperature range of the liquid crystal panel 20, The transparent heater 31 is used so that the light from the backlight 14 passes perfectly through the heater 31.

Although the transparent heater 31 is formed on the polarizer 23 in FIG. 7, it is possible to form it on the first substrate 25 or the second substrate 26. Further, the transparent heater 31 can be formed on the inner surface (facing the liquid crystal layer 28) and/or outer surface of the first substrate 25 and/or the second substrate 26.

Figure 8:
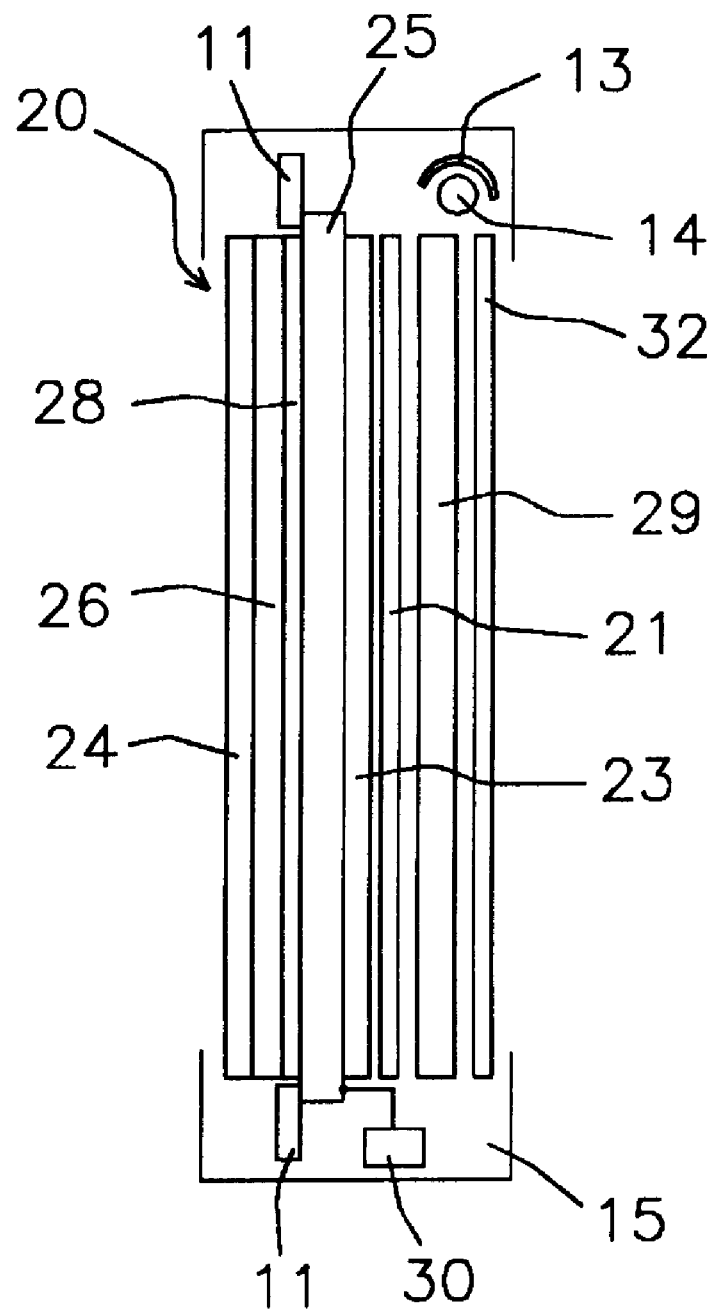
FIG. 8 is a sectional view of the third embodiment of the present invention.

FIG. 8 is a view showing the third embodiment of the present invention. In this embodiments the heater is formed at the rear of the light guide plate.

The third embodiment is different from the second embodiment in that the heater 32 is formed out of the light guide plate 29. The temperature controlling device 30 connected to the liquid crystal panel 20 and the heater 32 controls the temperature of the liquid crystal panel 20 to be at 40–50° C. The heater 32 is a thin film formed on the light guide plate 29 to heat uniformly the liquid crystal panel 20. Further, the heater 32 can be formed in a plate shape. Since the light is irradiated to only the first and second substrates 25,26, an opaque electrode can be used as the heater of the present embodiment. When a voltage is applied to the electrode in the second embodiment, the heat generated by the resistance of the electrode 32 heats the liquid crystal panel 20.

Accordingly, the second and third embodiments have a similar concept as in the first embodiment. Thus, the same effect of the first embodiment is obtained from the second and third embodiments.

In the present liquid crystal display device, the temperature controlling device heats and controls the liquid crystal panel within a uniform temperature range, so that the response speed is increased. Thus, the liquid crystal display device having a large size screen of more than 20 inches and a successive dynamic image can be produced.

Moreover, since the liquid crystal panel 15 retained in a constant temperature range, a characteristic variation caused by a temperature variation is prevented.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a liquid crystal panel including a first substrate, a second substrate, and a liquid crystal layer between the first and second substrates; and
   a backlight adjacent to the liquid crystal panel for irradiating light, wherein a surface of the backlight is coated with an infrared radiation material to generate infrared rays from the backlight, so that the backlight acts as a heater for heating the liquid crystal panel as well.

2. The device according to claim 1, further comprising:
   a light guide plate for guiding the light from the backlight; and
   a light diffusion plate between the liquid crystal panel and the light guide plate.

3. The device according to claim 1, further comprising:
   a first polarizer on the first substrate; and
   a second polarizer on the second substrate.

4. The device according to claim 1, further comprising;
   temperature controlling member for controlling a temperature of the liquid crystal panel.

5. The device according to claim 4, wherein the temperature controlling member includes:
   a temperature sensing unit coupled to the liquid crystal panel and sensing the temperature of the liquid crystal panel; and
   a temperature controlling unit coupled to the temperature sensing unit and controlling the temperature of the liquid crystal panel within a set range.

6. The device according to claim 5, wherein the set range is approximately between 40° C. to 50° C.

7. A liquid crystal display device comprising:
   a liquid crystal panel including a first substrate, a second substrate, and a liquid crystal layer between the first and second substrates;
   a backlight adjacent to the liquid crystal panel for irradiating light, wherein a surface of the backlight is coated with an infrared radiation material to generate infrared rays from the backlight, so that the backlight acts as a heater for heating the liquid crystal panel as well;
   a transparent heater for heating the liquid crystal panel; and
   a temperature controlling member coupled to the liquid crystal panel and the backlight for controlling a temperature of the liquid crystal panel to be within a set range.

8. The device according to claim 7, further comprising:
   a light guide plate adjacent the backlight for guiding the light from the back light; and
   a light diffusion plate between the liquid crystal panel and the light guide plate.

9. The device according to claim 7, further comprising;
   a first polarizer on the first substrate; and
   a second polarizer on the second substrate.

10. The device according to claim 7, wherein the temperature controlling member includes:
    a temperature sensing unit coupled to the liquid crystal panel and sensing the temperature of the liquid crystal panel; and
    a temperature controlling unit coupled to the temperature sensing unit and controlling the temperature of the liquid crystal panel.

11. The device according to claim 7, wherein the set range is approximately between 40° C. to 50° C.

12. The device according to claim 7, wherein the transparent heater includes:
a plastic film; and
a transparent metal on the plastic film.

13. The device according to claim 12, wherein the transparent metal includes indium tin oxide.

14. The device according to claim 7, wherein the transparent heater is attached to the liquid crystal panel.

15. The device according to claim 7, wherein the transparent heater is on at least one of the first and second substrates.

16. The device according to claim 7, wherein the transparent heater is located at an inner face of the at least one of the first and second substrates facing the liquid crystal layer.

17. The device according to claim 7, wherein the transparent heater is located at least one of the first and second substrates.

18. A liquid crystal display device comprising:
a liquid crystal panel including a first substrate, a second substrate, and a liquid crystal layer between the first and second substrates;
a heating plate for heating the liquid crystal panel;
a backlight adjacent to the liquid crystal panel for irradiating light, wherein a surface of the backlight is coated with an infrared radiation material to generate infrared rays from the backlight, so that the backlight acts as a heater for heating the liquid crystal panel as well;
a temperature controlling member for controlling the temperature of the liquid crystal panel to be within a set range, the temperature controlling member being connected to the liquid crystal panel and the heating plate;
a light guide plate for guiding the light from the backlight; and
a light diffusion plate between the liquid crystal panel and the light guide plate.

19. The device according to claim 18, wherein the heating plate is mounted at a rear of the light guide plate.

20. The device according to claim 19, wherein the heating plate includes an opaque metal.

21. The device according to claim 18, further comprising:
a first polarizer on the first substrate; and
a second polarizer on the second substrate.

22. The device according to claim 18, wherein the temperature controlling member includes:
a temperature sensing unit coupled to the liquid crystal panel and sensing a temperature of the liquid crystal panel; and
a temperature controlling unit coupled to the temperature sensing unit for controlling the temperature of the liquid crystal panel.

23. The device according to claim 18, wherein the set range is approximately between 40° C. to 50° C.

24. The device according to claim 18, wherein the heating plate is at a rear of the light guide plate.

25. The device according to claim 18, wherein the heating plate includes an opaque metal.

26. A liquid crystal display device comprising:
a liquid crystal panel including a first substrate, a second substrate, and a liquid crystal layer between the first and the second substrates;
a first polarizer on the first substrate;
a second polarizer on the second substrate;
a backlight adjacent to the liquid crystal panel for irradiating light, wherein a surface of the backlight is coated with an infrared radiation material to generate infrared rays from the backlight, so that the backlight acts as a heater for heating the liquid crystal panel as well;
a light guide plate adjacent to the backlight for guiding light from the backlight to the liquid crystal panel;
a light diffusion plate between the liquid crystal panel and the light guide plate;
a heating plate for heating the liquid crystal panel;
a temperature sensing unit coupled to the liquid crystal panel and the heating plate for sensing a temperature of the liquid crystal panel; and
a temperature controlling unit coupled to the temperature sensing unit for controlling the temperature of the liquid crystal panel within a set range.

27. The device according to claim 26, wherein the set range is approximately between 40° C. to 50° C.

28. The device according to claim 26, wherein the heating plate is at a rear of the light guide plate.

29. The device according to claim 26, wherein the heating plate includes an opaque metal.

* * * * *